United States Patent [19]

Imamura

[11] 4,265,627
[45] May 5, 1981

[54] POWER TRANSMISSION BELT

[75] Inventor: Junji Imamura, Kobe, Japan

[73] Assignee: Mitsuboshi Belting Ltd., Kobe, Japan

[21] Appl. No.: 52,273

[22] Filed: Jun. 26, 1979

[30] Foreign Application Priority Data

Apr. 5, 1979 [JP] Japan ................................ 54-41679

[51] Int. Cl.³ .................................................. F16G 5/08
[52] U.S. Cl. ....................................... 474/267; 156/139
[58] Field of Search ........................ 74/232, 233, 234; 428/175, 261, 262, 266, 267; 156/139

[56] References Cited

U.S. PATENT DOCUMENTS

| | | | |
|---|---|---|---|
| 2,822,856 | 2/1958 | Waugh | 156/139 |
| 3,404,577 | 10/1968 | Zahn | 74/233 |
| 3,478,613 | 11/1969 | Waugh et al. | 74/233 |
| 3,523,461 | 8/1970 | Nemecek et al. | 74/233 X |
| 3,564,933 | 2/1971 | Clinkenbeard | 74/233 |
| 3,622,431 | 11/1971 | Turcksin | 74/232 |
| 3,872,735 | 3/1975 | Hnatek | 74/231 R |
| 3,924,482 | 12/1975 | Meadows | 474/267 |
| 3,996,813 | 12/1976 | Henderson et al. | 74/233 |

Primary Examiner—C. J. Husar
Assistant Examiner—Conrad Berman
Attorney, Agent, or Firm—Sughrue, Rothwell, Mion, Zinn and Macpeak

[57] ABSTRACT

A power transmission belt having a plurality of V-belt bodies arranged side by side and driven simultaneously by one pulley. The entire surface of each V-belt is covered with a rubbered bias fabric. The upper surfaces of the V-belt bodies are connected with a single ply or plural plies of rubbered stretchable fabric.

7 Claims, 11 Drawing Figures

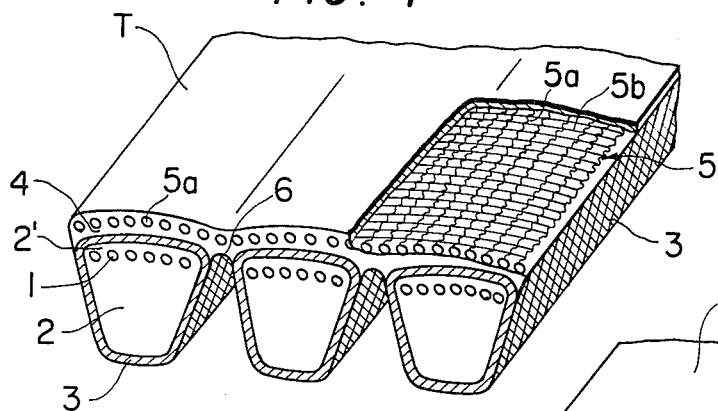
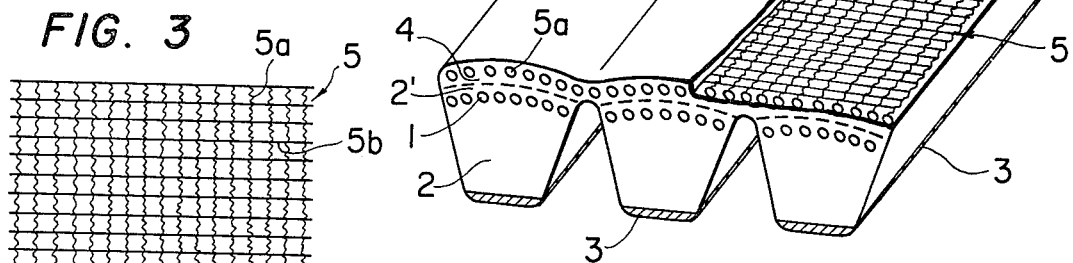
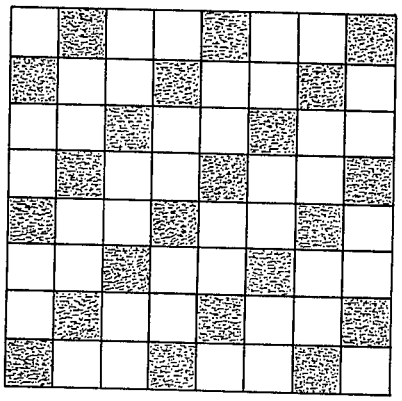
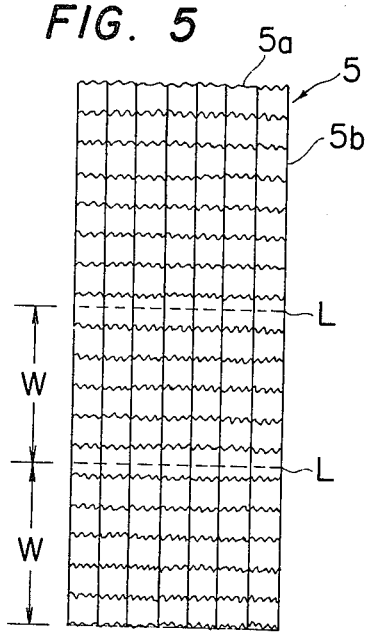
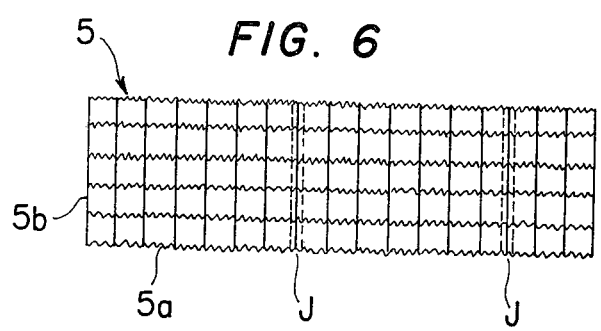

POWER TRANSMISSION BELT

BACKGROUND OF THE INVENTION

This invention relates to a power transmission belt adapted to transmit power from one pulley to another pulley. The invention is intended to overcome the difficulties inherent in a so-called "multi-V-belt" adapted to transmit large torques from a driving pulley to a driven pulley. The problems include vibration and turn-over thereof, which are often caused during the run. This invention also eliminates power transmission loss due to the non-uniformity in length of the belt elements forming the multi-V-belt, and increases the service life thereof.

In a conventional multi-V-belt drive system, a plurality of belts are laid over pulleys having a plurality of pulley grooves in such a manner that the belts engage the pulley grooves, respectively. Therefore, in the case where the multi-V-belt system is employed for driving a machine such as a crusher or a compressor which generates a relatively great impact load, the belts are liable to be vibrated separately and to be brought into contact with one another. As a result, the belts may be turned over, or come off the pulleys, and the belts may be prematurely damaged. A V-belt is driven through friction, and therefore it is necessary to apply a suitable tension to the belt before it is run. However, in the conventional multi-V-belt system, the belts are liable to be non-uniform in tension because as described above, the lengths of the belts are not uniform and as a result the belts are vibrated and the service lives thereof are shortened.

In order to overcome these difficulties, a power transmission belt has been proposed in the art, which is obtained by connecting the upper surfaces of individual V-belt bodies with a tie band formed with a wide cross angle fabric. Because the wide cross angle fabric is used, the belt is high in lengthwise stretchability, but it is low in widthwise stretchability because the angle in the widthwise direction is smaller. Accordingly, the belt cannot satisfactorily engage with the pulley, and the tie band is liable to peel off the belt. Thus, the proposed belt is still disadvantageous.

A power transmission belt using a nylon cord fabric as its tie band is also known in the art. This belt has excellent stretchability in the longitudinal direction. However, when the belt is used with a small diameter pulley, the rubber interposed between the cords of the cord fabric is excessively stretched, and accordingly the rubber is liable to be cracked. Since nylon cord fabric is used, the stretchability of the belt in the lateral direction is low, and therefore, the belt cannot suitably engage the pulley.

SUMMARY OF THE INVENTION

Accordingly, an object of this invention is to eliminate all of the above-described difficulties accompanying a conventional power transmission belt.

Another object of this invention is to provide a power transmission belt having a tie band stretchable only in the longitudinal direction to have uniformity of width.

Still another object of this invention is to provide a power transmission belt that eliminates power transmission losses.

The foregoing and other objects of the invention have been achieved by the provision of a power transmission belt comprising a plurality of V-belt bodies, and a tie band stretchable only in the longitudinal direction. The tie band connects the upper surfaces of the V-belt bodies. In the power transmission belt according to the invention, the width of the tie band is negligibly changed because of the lengthwise stretchability.

This invention will be described with reference to the accompanying drawings and the description of the preferred embodiments.

BRIEF DESCRIPTION OF THE DRAWINGS

FIG. 1 and FIG. 2 are perspective views showing examples of a power transmission belt according to this invention;

FIG. 3 is a plan view of one example of a stretchable fabric arranged in a tie band of the power transmission belt according to the invention;

FIG. 4 is an explanatory diagram showing the woven pattern of the stretchable fabric shown in FIG. 3;

FIG. 5 is a plan view of another example of the fabric used for forming the tie band of the power transmission belt according to the invention;

FIG. 6 is a plan view showing the fabric illustrated in FIG. 5 which is rearranged to be embedded in the rubber layer of the tie band;

DESCRIPTION OF THE PREFERRED EMBODIMENTS

Figure 7:
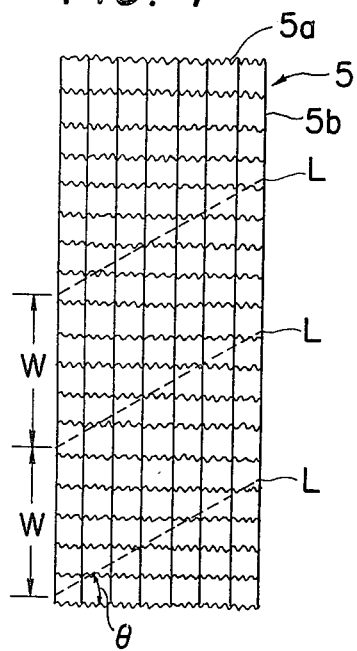
FIG. 7 illustrates another method of cutting the woven fabric shown in FIG. 5.

FIG. 1 shows one example of a power transmission belt according to the invention. In FIG. 1, reference numeral 1 designates a tensile member made of a rope of fibers such as polyester fibers, nylon fibers, rayon fibers or aromatic polyamide fibers ("Kevlar") high in strength in a V-belt body. A compression rubber layer 2 and an upper core rubber layer 2' are also shown. The outer surface of each V-belt body is covered with a rubbered bias fabric 3 made of cotton yarns. The upper parts of the V-belt bodies are connected to one another with one tie band T which is obtained by covering the upper and lower surfaces of a stretchable fabric 5 with rubber 4, to form one unit.

The V-belt bodies are ordinary wrapped V-belts. The tie band T is manufactured in accordance with the following method in order to improve its stretchability in a longitudinal direction and its rigidity in a lateral direction. Stretchable crimped nylon yarns subjected to wooly treatment are employed as warps 5a, and cotton yarns, nylon yarns or polyester yarns high in rigidity are employed as wefts 5b, to weave the fabric 5. The fabric 5 is embedded in the flexible rubber 4 which is equal in quality to the rubbers 2 and 2' of the V-belt body.

An ordinary plain weave fabric stretchable only in the longitudinal direction may be employed; however, in this invention a twill weave fabric is primarily employed in order to increase the service life of the belt.

The twill weave fabric 5 is a twill weave pattern, in which the warps 5a and wefts 5b each have at least three yarns interlaced with one another to show diagonal lines on the surface. The warps 5a and wefts 5b form wavy cross-points every two yarns. Therefore, the number of wavy cross-points of the twill weave fabric is much smaller than that of the ordinary plain weave fabric. Accordingly, it is possible to sufficiently fill the spaces between the yarns and the cross points with the rubber 4. Therefore, it is possible to prevent the warps 5a and the wefts 5b from being brought in direct contact with one another when the belt is bent. This results in an improvement of the service life of the belt.

FIGS. 3 and 4 are detailed pattern diagrams showing one example of a fabric used as the tie band of the power transmission belt described above. As shown in these figures, crimped nylon yarns made stretchable through wooly treatment are used as the warps 5a, and ordinary nylon yarns, cotton yarns or polyester yarns are employed as the wefts 5b, to weave the fabric having a twill weave pattern.

The fabric having the twill weave pattern is suitable as the tie band T of the belt according to the invention, because it has appropriate stretchability. The woven pattern results in a weave fabric in which the warps and the wefts are alternately interlaced with one another. That is, in the woven pattern, as shown in FIG. 4, a first warp W1 appears over a weft F1, then disappears under the next two wefts F2 and F3, and then appears over the fourth weft F4. A second warp W2 next to the warp W1 disappears under the wefts F1 and then appears over the next weft F2. A third warp W3 next to the warp W2 disappears under the wefts F1 and F2 and the appears over the weft F3; and so forth.

If this woven pattern is viewed by standing on the side of the wefts, the weft F1 disappears under the warp W1 and then appears over the warps W2 and W3. The weft F2 appears over the warp W1, then disappears under the warp W2, and appears over the warps W3 and W4. The third weft F3 appears over the warps W1 and W2 and then disappears under the warps W3; and so forth. Since the warps and the wefts are interlaced with one another this way, the positions of the visible warps and wefts move stepwise upward to the right. As a result a woven pattern having oblique lines which run upward to the right is defined; that is, a so-called twill weave is obtained.

With respect to the connection of the tie band T made of the fabric as shown in FIGS. 3 and 4 to the V-belt bodies, it is unnecessary to arrange the tie band T to have a wide angle, unlike the conventional tie band, because the warps 5a of the stretchable fabric 5 forming the tie band T have been treated to be stretchable. That is, as shown in the cut away section of FIG. 1, the tie band can be effectively arranged so that the wefts 5b of the stretchable fabric 5 form a 90° angle with the longitudinal axis of the belt.

The tie band T may be bonded to the V-belt bodies with an adhesive because the rubber 4 incorporating the stretchable fabric 5 is equal in quality to the rubbers 2 and 2' of the V-belt bodies. However, it is advisable that the tie band and the V-belt bodies be strongly combined together as one unit in the process of vulcanization. In addition, it is preferable that a U-shaped thin groove 6 be formed between adjacent V-belt bodies and in the lower surface of the tie band T.

FIG. 2 shows a second embodiment of the power transmission belt according to the invention. In this belt, the structure of its tie band T and the connection of the tie band to its V-belt bodies are similar to those of the belt shown in FIG. 1. However, in the belt shown in FIG. 2, only the lower surface of each V-belt body is covered with a rubbered bias fabric 3, and the both sides thereof are not covered with the fabric so that the rubber 2 is exposed.

Hence, the power transmission belt shown in FIG. 2 is obtained by connecting raw edge type V-belt bodies with the tie band. In this power transmission belt, the side surfaces of each V-belt body are not covered with the fabric. Therefore, the power transmission belt is advantageous in that the coefficient of friction of the belt is higher than that of the wrapped V-belt shown in FIG. 1, and accordingly the power transmission performance is higher.

In the above-described examples, only one ply of stretchable fabric 5 is employed for forming the tie band; however, it should be noted that the invention is not limited thereto or thereby. That is, two or more plies of stretchable fabric can be used for forming the tie band depending on requirements of actual use.

The power transmission belt according to the invention is formed as described above. In other words, a plurality of V-belt bodies are connected together with the tie band obtained by embedding in the rubber the particular fabric. The fabric is woven with the stretchable crimped yarns, subjected to wooly treatment, as the warps and with the cotton yarns, the nylon yarns or polyester yarns as the wefts so that the number of cross points is small, in such a manner that the wefts form 90 degrees with the longitudinal axis of the belt.

Accordingly, when compared with the conventional multi-V-belt or the conventional power transmission belt (multi-rib-belt) obtained by connecting V-belt bodies with a tie band, the stretchability in the longitudinal direction of the power transmission belt according to the invention is considerably high. With the power transmission belt according to the invention, problems such as vibration, turn-over and removal, which occur frequently with the conventional power transmission belt can be effectively prevented, the belt life is increased, and the power transmission performance is improved.

Also, a power transmission belt is greatly affected by the conditions in use, especially by heat and water; that is, sometimes the width of the belt is changed by these factors. As a result, the belt cannot satisfactorily engage the pulley. However, this difficulty can be effectively eliminated by the power transmission belt according to the invention, because the wefts 5b are cotton yarns, nylon yarns or polyester yarns high in rigidity.

Now, the conditions of use of the fabric incorporated in the tie band T of the power transmission belt according to the invention will be described.

The fabric 5 is, in general, a plain weave fabric or a twill weave fabric which is obtained by weaving wefts 5a which are crimped nylon yarns subjected to wooly treatment and warps 5b which are cotton yarns, nylon yarns or polyester yarns. This is shown in FIG. 5. The fabric 5 thus obtained is cut along the lines L into several pieces of fabric having the same width W. The pieces of fabric are connected together at the lines J as indicated in FIG. 6 so that the wefts 5a of the original plain weave fabric or twill weave fabric 5 are extended in the longitudinal direction of the belt and the warps 5b of the same are extended in the lateral direction of the belt to form a long fabric.

The long fabric thus formed is incorporated in the belt. More specifically, the long fabric 5 obtained is embedded in the connecting rubber 4 of the tie band T in such a manner the crimped nylon yarns 5a subjected to wooly treatment extend in the lengthwise direction of the belt, and the cotton yarns, nylon yarns or polyester yarns 5b extend in the widthwise direction of the belt. Accordingly, the stretchability in the longitudinal direction of the belt is improved, and the change in the widthwise direction of the belt can be to a certain extent limited.

The wefts 5b of the fabric embedded in the rubber 4 must be yarns such as cotton yarns, nylon yarns or polyester yarns which are low in stretchability but high in rigidity. If the yarns are excessively stretchable or cannot stretch at all, the belt cannot satisfactorily engage the pulley. Therefore, in order to permit the belt to sufficiently engage the pulley, the yarn must have a suitable stretchability. In view of this, nylon yarns most suitable are those stretched relatively greatly by heat generated during the run of the belt.

In the above-described case, the plain weave fabric or twill weave fabric shown in FIGS. 5 and 6 is embedded in the rubber 4 of the tie band T in such a manner that it is right-angled with the lengthwise direction of the belt. That is, the warps 5a are exposed on the sides of the tie band T. Therefore, the warps 5a are liable to be frayed out of the sides of the tie band. This difficulty may be overcome by arranging the fabric 5 in such a manner that the direction of the warps is oblique with respect to the belt.

Figure 9:
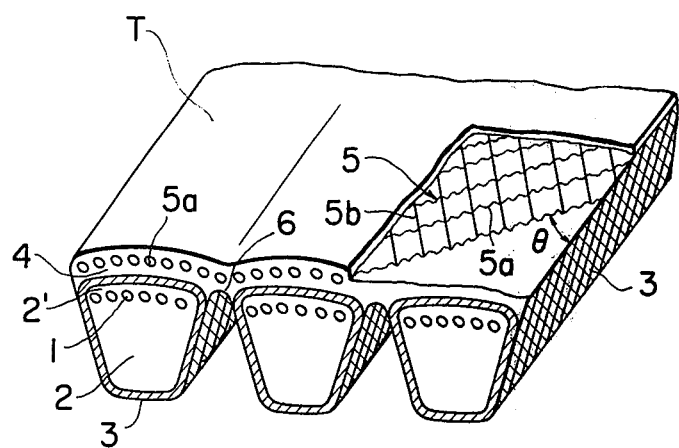
FIG. 9 is a perspective view of another example of the power transmission belt according to the invention in which the fabric in FIG. 8 is employed.

FIG. 9 shows a third embodiment of the power transmission belt according to the invention, in which the fabric 5 is embedded in the rubber 4 in such a manner that the warps extend obliquely with respect to the belt. Accordingly, all of the components of the power transmission belt shown in FIG. 9 are the same as those of the belt shown in FIG. 1, except for the fabric 5.

Figure 8:
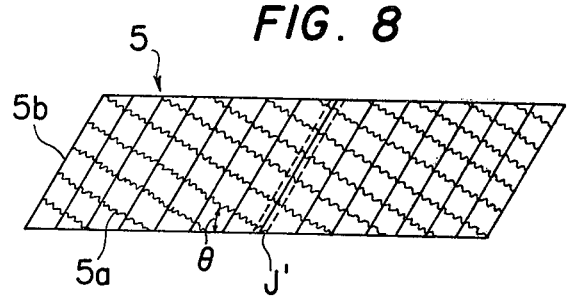
FIG. 8 is a plan view showing the fabric illustrated in FIG. 7 which is rearranged to be embedded in the rubber layer of the tie band.

FIGS. 7 and 8 are plan views showing the fabric and the conditions in use of the fabric. The fabric 5 shown in FIG. 7 is a plain weave fabric obtained by weaving wefts 5a which are crimped nylon yarns and warps 5b which are cotton yarns, nylon yarns or polyester yarns, similarly as in the case of FIG. 5. The fabric is cut along the lines L (inclined by an angle θ) into several pieces of fabric having the same width.

These pieces of fabric are connected together at the lines J as shown in FIG. 8 in such a manner that the wefts 5a of the fabric 5 are inclined by the angle θ, to form a long fabric. The long fabric thus formed is embedded in the rubber layer 4 of the tie band T adapted to connect the V-belt bodies as shown in FIG. 9. In this case, the warps 5a (which were the wefts of the original fabric) made of the stretchable nylon yarns subjected to wooly treatment form the angle θ with the lengthwise directon of the belt.

The angle θ is, in general, in a range of from 0 to 40 degrees. If the angle θ is larger than 40 degrees, then the direction of the stretchable warps 5a approaches the widthwise direction of the belt. As a result, the stretchability in the lengthwise direction of the belt is decreased, and the width of the belt is greatly changeable, thus making engagement of the belt with the pulley unsatisfactory. Therefore, it is most suitable that the angle θ be in the range of 0 to 40 degrees. In this case, it is possible to positively prevent the warps 5a from being frayed out of the tie band.

The plain weave fabric and the twill weave fabric shown in FIGS. 6 and 8 are obtained by cutting the original fabrics laterally and obliquely into several pieces of fabric and joining these pieces of fabric together, respectively. Therefore, the joint parts J are thicker than the other parts. Accordingly, if this long fabric is embedded in the rubber 4 of the tie band T, then the thickness of the tie band T becomes non-uniform, which may vibrate the belt.

Figure 10:
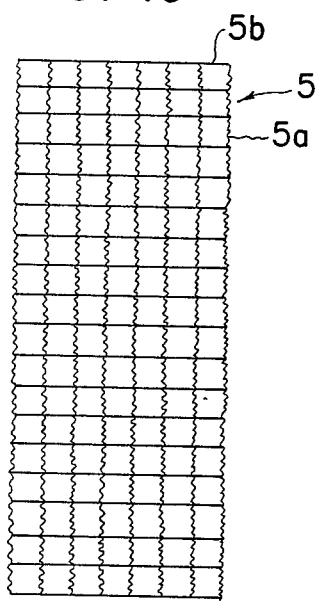
FIG. 10 is a plan view of another example of the fabric used in the tie band of the power transmission belt according to the invention.

This difficulty can be eliminated by using a plain weave fabric or a twill weave fabric which is obtained by weaving warps 5a which are crimped nylon yarns subjected to wooly treatment and wefts 5b which are cotton yarns, nylon yarns or polyester yarns as shown in FIG. 10. In the case of this plain weave fabric or twill weave fabric, unlike the fabric shown in FIGS. 6 and 8, it is unnecessary to cut the fabric into several pieces of fabric and to join them together. That is, the fabric 5 can be used as is.

Figure 11:
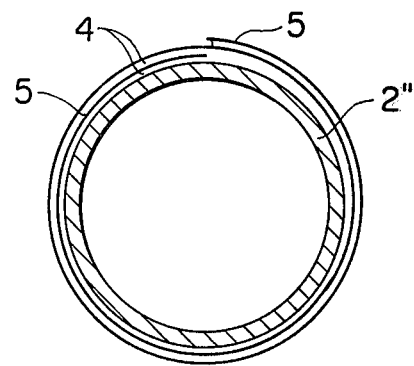
FIG. 11 is a side view showing a method of winding the fabric shown in FIG. 10 around the V-belt bodies of the power transmission belt according to the invention.

When only a single ply of fabric 5 is embedded in the rubber 4 of the tie band, no joint part is created with the fabric. If, in the case where at least two plys of fabric 5 are embedded in the rubber 4, the fabric 5 with a thin rubber layer 4 bonded thereto is wound spirally around the upper surfaces of a plurality of V-belt bodies 2″ as shown in FIG. 11, then unlike the cases of FIGS. 6 and 8, no joint part is created with the spirally wound fabric. Therefore, if the fabric is spirally wound in succession in this manner, then a belt having a uniform thickness can be obtained.

As is apparent from the above description, the power transmission belt, according to the invention, is obtained by connecting the upper surfaces of a plurality of V-belt bodies by using the tie band in which the fabric stretchable in the longitudinal direction and rigid in the lateral direction is embedded. The resulting power transmission belt has the following merits:

(1) Since the plain weave fabric or twill weave fabric with crimped nylon yarns subjected to wooly treatment for the warps is used for the tie band, the stretchability of the belt according to the invention is excellent when compared with that of the conventional multi-V-belt or the conventional power transmission belt obtained by connecting V-belt bodies with a tie band. It is possible to prevent the belt from vibrating, turning over, and coming off the pulley. In addition, the service life and the power transmission performance of the belt can be increased.

(2) Since the plain weave fabric or twill weave fabric obtained by weaving warps which are crimped nylon yarns subjected to wooly treatment and wefts which are cotton yarns, nylon yarns or polyester yarns high in rigidity and low in stretchability is arranged in the tie band in such a manner that the stretchable warps extend in the lengthwise direction of the belt, the flexibility of the belt is increased in the longitudinal direction of the belt. The width of the belt is not significantly changed under undesirable conditions such as the presence of heat or water, and therefore the belt can be satisfactorily engaged with the pulley at all times.

(3) Since the fabric is embedded in the rubber layer of the tie band in such a manner that the warps form 0 to 40 degrees with the axial direction of the belt, it is possible to prevent the warps from being frayed out of the belt.

(4) The plain weave fabric or twill weave fabric obtained by weaving warps which are crimped nylon yarns subjected to wooly treatment and wefts which are cotton yarns, nylon yarns or polyester yarns is used, as it is, for the tie band. Therefore, the fabric has no joint parts, and accordingly the tie band is uniform in thickness. Thus, the vibration of the belt can be positively prevented.

What is claimed is:

1. In a power transmission belt having a plurality of V-belt bodies arranged side by side and driven simultaneously by a pulley, the upper surfaces of said V-belt bodies being connected with at least one ply of rubbered stretchable fabric, the improvement comprising:

said stretchable fabric including crimped nylon yarns subjected to wooly treatment and extending in a direction at an angle $\theta$ with respect to the longitudinal axis of the transmission belt, where $0° < \theta \leq 40°$, whereby with $0° < \theta$ entire crimped nylon yarns will not be eliminated from said belt due to abrasion, and with $\theta \leq 40°$ said crimped nylon yarns will enhance the longitudinal stretchability of said belt.

2. The power transmission belt as in claim 1 wherein said rubbered stretchable fabric comprises multiple plies.

3. A power transmission belt as claimed in claim 2, wherein said stretchable fabric is a twill weave fabric obtained by weaving warps selected from the group consisting of cotton yarns, nylon yarns and polyester yarns, and wefts which are crimped nylon yarns subjected to wooly treatment, and said fabric arranged in such a manner that said crimped wefts extend in the longitudinal direction of said belt and said warps extend to form right angles with the longitudinal direction of said belt.

4. A power transmission belt as claimed in claims 2 or 1, wherein said stretchable fabric is a plain weave fabric obtained by weaving warps selected from the group consisting of cotton yarns, nylon yarns and polyester yarns, and wefts which are crimped nylon yarns subjected to wooly treatment, and said fabric is arranged in such a manner that said crimped nylon yarns subjected to wooly treatment form an angle of 0° to 40° with the longitudinal direction of said belt.

5. A power transmission belt as claimed in claims 2, or 1, wherein said stretchable fabric is a twill weave fabric obtained by weaving warps which are selected from the group consisting of cotton yarns, nylon yarns and polyester yarns, and wefts which are crimped nylon yarns subjected to wooly treatment, and said fabric is arranged in such a manner that said crimped nylon yarns subjected to wooly treatment form an angle of 0° to 40° with the longitudinal direction of said belt.

6. In a power transmission belt having a plurality of V-belt bodies arranged side by side and driven simultaneously by a pulley, the upper surfaces of said V-belt bodies connected with at least one ply of rubbered stretchable fabric, the improvement comprising:

said stretchable fabric comprising warp fibers extending in a first direction and weft fibers extending in a second direction, the fibers extending in one of said first and second directions comprising crimped nylon yarns, said warp and weft fibers being woven together in a twill weave whereby contact between said warp and weft fibers is reduced and the service life of said belt is enhanced.

7. A power transmission belt as claimed in claim 6, wherein said stretchable fabric is a twill weave fabric obtained by weaving warps which are crimped nylon yarns subjected to wooly treatment and wefts which are selected from the group consisting of cotton yarns, nylon yarns and polyester yarns, and said fabric is laid spirally and in lamination form in such a manner that said warps extend in the longitudinal direction of said belt while said wefts are at right-angles with the longitudinal direction of said belt, whereby the formation of joints by said fabric is eliminated.

* * * * *